June 22, 1965  W. W. BRONSON  3,190,120
TEMPERATURE MEASURING AND RECORDING APPARATUS
Filed June 28, 1961  4 Sheets-Sheet 3
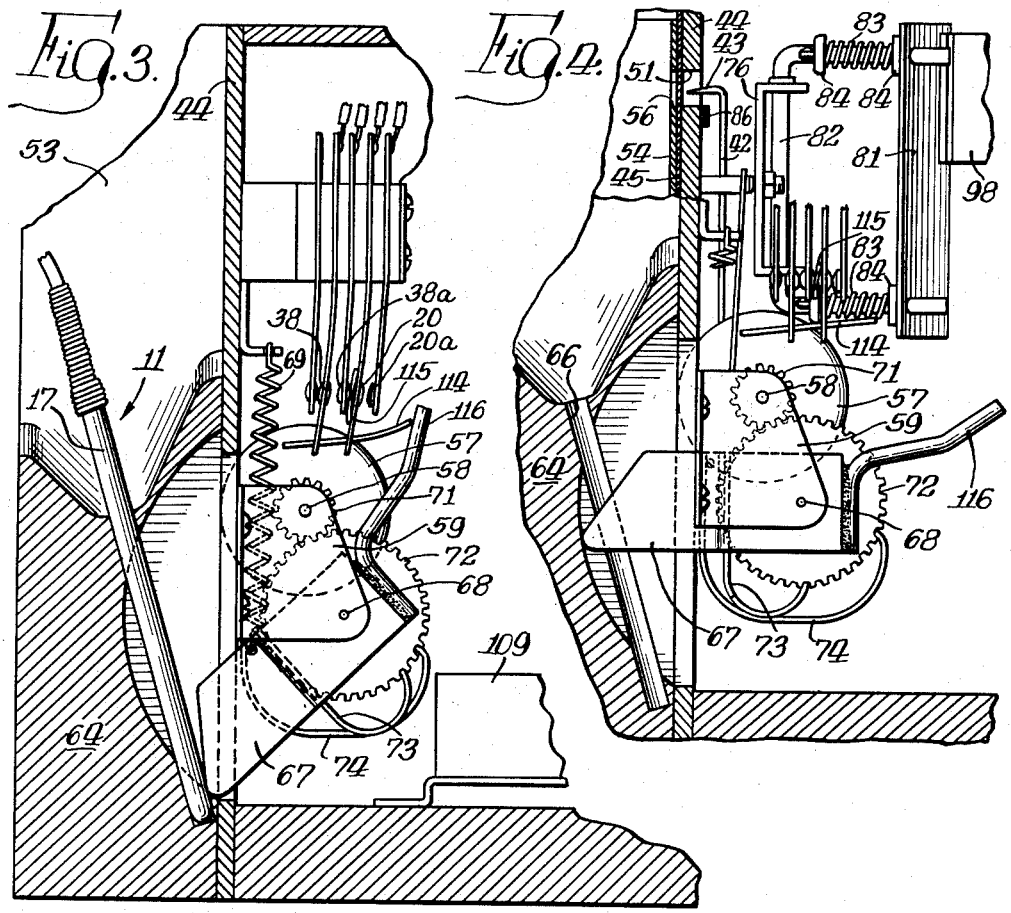
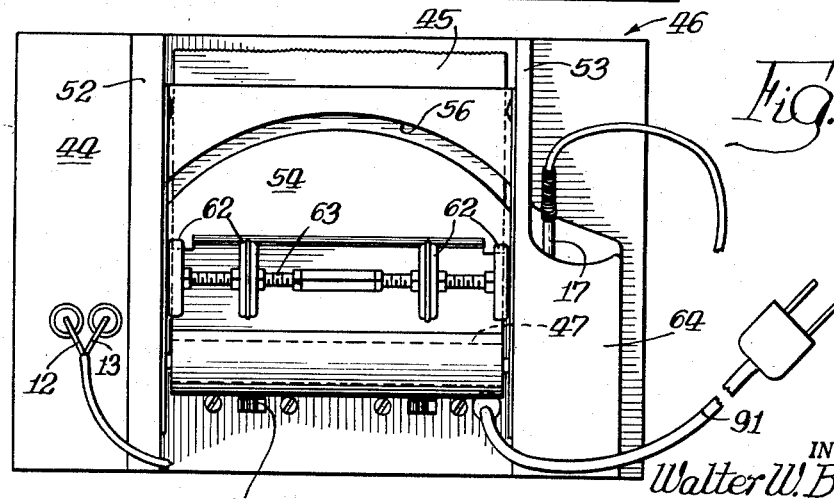
INVENTOR.
Walter W. Bronson,
BY
Davis, Lindsey, Hibben & Noyes
Atty's.

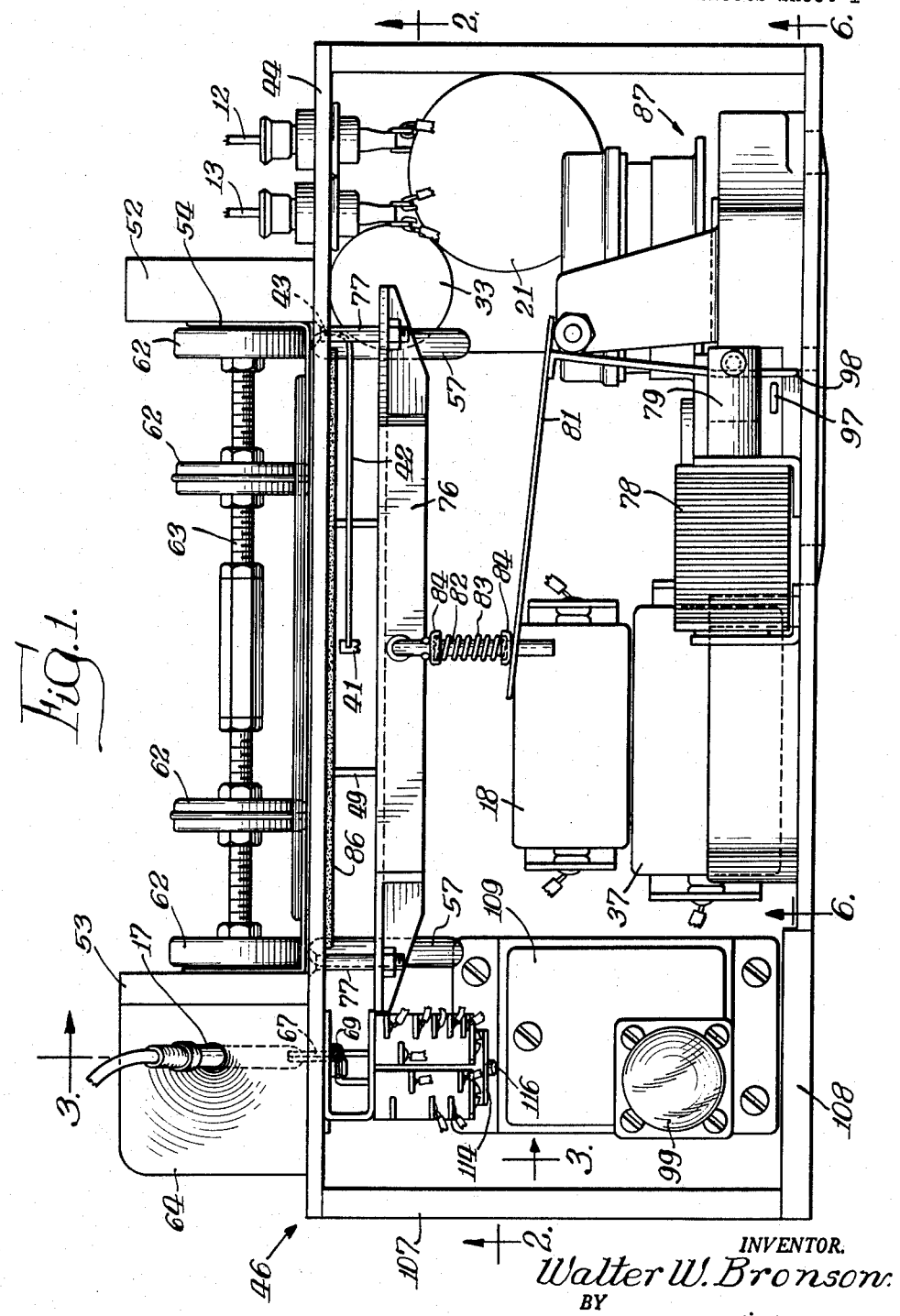

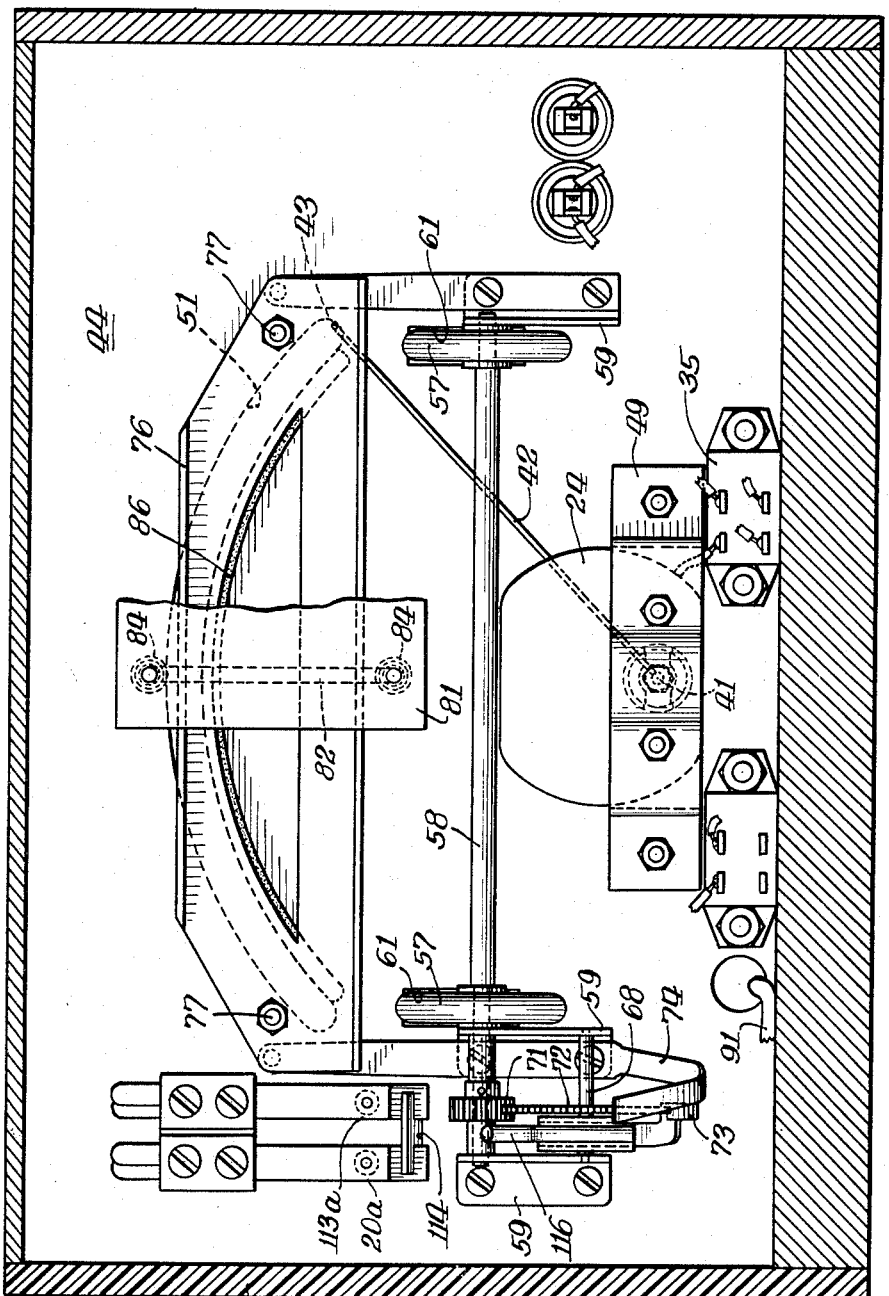

June 22, 1965   W. W. BRONSON   3,190,120
TEMPERATURE MEASURING AND RECORDING APPARATUS
Filed June 28, 1961   4 Sheets-Sheet 4
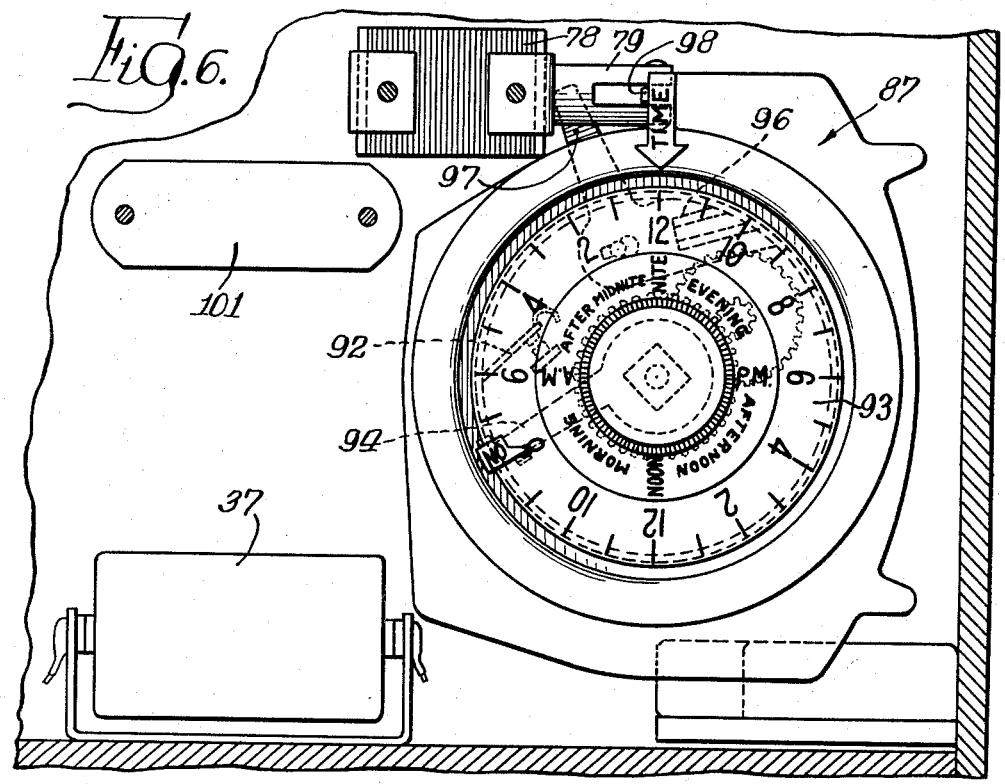
Fig. 6.
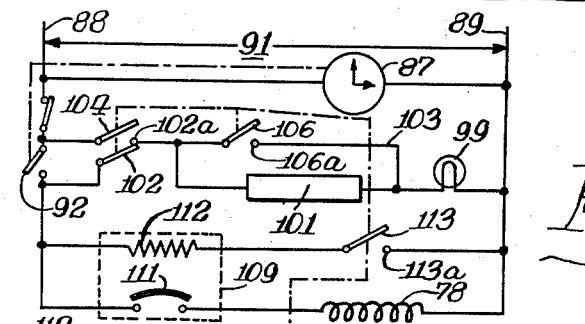
Fig. 7.
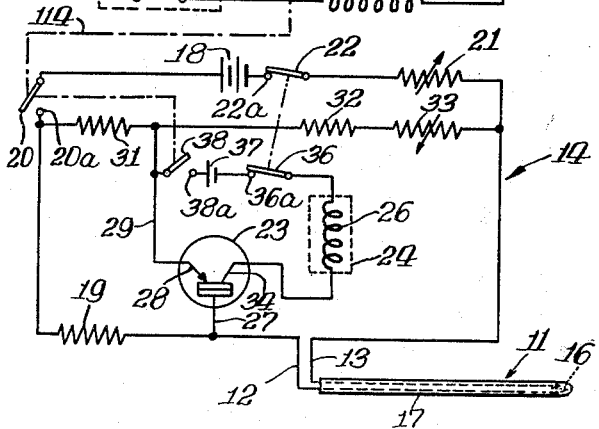
INVENTOR.
Walter W. Bronson,
BY
Davis, Lindsey, Hibben & Noyes
Atty's.

United States Patent Office 3,190,120
Patented June 22, 1965

3,190,120
TEMPERATURE MEASURING AND RECORDING
APPARATUS
Walter W. Bronson, 1146 E. 85th St., Chicago, Ill.
Filed June 28, 1961, Ser. No. 120,427
10 Claims. (Cl. 73—343.5)

This invention relates to temperature measuring devices and more particularly to a device for measuring human temperatures and for automatically recording the temperatures measured.

It is a primary object of the present invention to provide apparatus for measuring and automatically recording human temperatures.

Another object is to provide temperature measuring and recording apparatus that is precise and fast in its operation.

A further object is to provide temperature measuring and recording apparatus arranged to enable an untrained person, while at home, to measure and chart the person's own basal temperatures.

Still another object is to provide temperature measuring apparatus equipped to provide, at a preselected time, a subtle alarm or signal for use in connection with the measurement of basal temperatures.

Yet another object is to provide temperature measuring and recording apparatus that automatically produces a permanent record or chart on which the temperatures measured are sequentially recorded at spaced intervals.

Other objects and advantages of the invention will be apparent from the following description taken in conjunction with the accompanying drawings, wherein:

FIG. 1 is a top plan view of apparatus embodying the present invention;

FIG. 2 is a sectional view of the apparatus taken along line 2—2 in FIG. 1;

FIG. 3 is a sectional view of the apparatus taken along line 3—3 in FIG. 1;

FIG. 4 is a view similar to FIG. 3 showing a portion of the apparatus as it appears when measuring a temperature;

FIG. 5 is a reduced scale view showing the back of the apparatus shown in FIG. 1;

FIG. 6 is a view of the apparatus taken along line 6—6 in FIG. 1; and

FIG. 7 is a diagrammatic view showing how elements of the apparatus in FIG. 1 are electrically interconnected.

Basically, the objects of the present invention are accomplished by apparatus which includes a temperature sensing device, means for measuring the temperature sensed by said device, a structure adapted to support record material, and means cooperating with said structure and said device for recording the temperature measured on the record material. The recording means is arranged to cooperate with the temperature measuring means to automatically record or register the temperature measured. The recording occurs after the temperature sensing device and the measuring means have become stabilized, and in the present apparatus stability is reached in less than ten seconds after a measurement has begun. A conventional form of time delay mechanism, energized when the temperature measuring apparatus is energized, is used to insure stability by actuating the recording means approximately ten seconds after the sensing device and measuring means is energized.

The record supporting structure is arranged to shift the record material after each measuring and recording operation. Thus, the temperatures measured will appear on the record at longitudinally spaced intervals and when the apparatus is used to measure temperatures of only one individual, the resulting record will be a chart of the individual's temperatures taken during a prescribed period of time. When the apparatus is used to successively measure the temperatures of several individuals, it will be possible to identify the temperature of each person, such as by correlating the temperatures recorded with a sequential list of persons whose temperatures were taken.

Preferably, the apparatus also includes a clockwork and an alarm or signaling device actuated by the clockwork. When the apparatus is to be used principally for charting basal temperatures, the alarm or signaling device should be a silent alarm, such as a flashing light. In addition to actuating the alarm system, the clockwork also operates switch means in the apparatus preliminary to the measuring and recording operations.

Before proceeding with a detailed description of the apparatus, it should be noted that the present apparatus was developed principally as an aid to birth control. According to present medical knowledge the most favorable time for conception, so far as the female is concerned, is shortly after ovulation. This time can be detected quite accurately by charting, day by day, the basal temperature of the female. The time of ovulation is indicated by a perceptible change in basal temperature.

Heretofore it was an expensive and time consuming process to obtain adequate basal temperature information for birth control purposes. Basal temperatures had to be taken daily and before the subject is fully awake. Thus, trained medical supervision was required. The present invention makes it possible to obtain the desired information at home in a simple and direct manner. Moreover, the invention provides a convenient, fast and accurate instrument for clinical use in measuring and recording human temperatures.

FIGS. 1 to 6 of the drawings show the mechanical features of one form of temperature measuring apparatus, embodying the features of the invention, that I have developed specifically for home use as an aid to birth control. FIGURE 7 illustrates schematically the circuit connections of the various electrical elements in the apparatus shown in FIGS. 1 to 6.

FIGURE 7 shows substantially all of the fundamental elements of the present apparatus. An electric temperature sensing device 11 is shown connected by a pair of leads 12 and 13 to temperature measuring means indicated generally at 14. The device 11 comprises, in this instance, a resistance element or thermistor 16 that has a negative temperature-resistance coefficient. In other words, the resistance of the thermistor 16 varies inversely with changes in its temperature. The thermistor 16 is mounted at and sealed within one end of an elongated hollow tube 17. The tube 17 is of heat conducting material so that the thermistor 16 can, in a matter of seconds, assume the temperature of its surroundings. The leads 12 and 13 project into the tube 17, through the end opposite that in which the thermistor 16 is mounted, and are respectively connected, within the tube, to the opposite ends of the thermistor 16.

The device 11 is intended for oral use by human beings and, therefore, is electrically insulated and sealed. Also, the device 11 mechanically cooperates with other parts of the apparatus in a manner to be more fully described hereinafter. For such mechanical cooperation, the tube 17 is sufficiently rigid, when assembled with the thermistor 16 and the leads 12 and 13 are sealed, to withstand a substantial amount of axial force.

The leads 12 and 13 form a single elongated flexible connection, as shown in FIG. 5, between the sensing device 11 and the measuring means 14, the leads 12 and 13 being connected, as shown in FIG. 7, in a bridge network across a voltage source, in this instance a battery 18. The lead 12 is connected to the positive end of the battery through a fixed resistance 19 and a movable switch element 20 that engages a fixed contact 20a. The lead 13 is connected to the negative end of the battery 18 through a potentiometer 21 and a movable switch element 22 that engages a fixed contact 22a. Cooperating with the resistance 19 and the thermistor 16 to form the bridge network are fixed resistances 31 and 32 and a potentiometer 33, these being connected as shown in FIG. 7. Resistances 19 and 31 are equal and the potentiometer 33 is adjusted so that its resistance combined with that of the resistor 32 equals the resistance of the thermistor 16 at a preselected temperature, such as 95° F. Thus, when the bridge network is in adjustment, the temperature of the thermistor 16 will be indicated by the magnitude of a potential difference between two points in the bridge, one point being the junction between resistances 31 and 32 and the other point being the junction between resistance 19 and thermistor 16. While the temperature can be determined by directly connecting a conventional meter across these points, changes in potential at these points are relatively slight. Consequently, I prefer to amplify the signal before making the measurement. Thus, the present apparatus is provided with a transistor 23 connected to provide an amplified signal for a meter 24 (see FIG. 2) having a field coil 26.

As shown in FIG. 7, the transistor 23 has its base electrode 27 connected to the junction located between the resistor 19 and the thermistor 16 and has its emitter electrode 28 connected by a lead 29 to the junction located between the resistances 31 and 32. The transistor 23 has its collector electrode 34 connected to the negative terminal of a battery 37 through the meter coil 26 and a switch having a movable contact 36 and a fixed contact 36a. The positive terminal of the battery 37 is connected to the lead 29 through a switch having a movable contact 38 and a fixed contact 38a. With this arrangement it can be seen that an increase in temperature of the thermistor 16 will cause the base 27 of the transistor 23 to become more negative with respect to its emitter 28 and this, in turn, causes an increased or amplified current flow through the collector electrode 34. The current through the collector electrode will have a magnitude proportional to the temperature of the thermistor 16 and this current passes through the coil 26 and operates the meter 24. The two potentiometers 21 and 33 permit adjustment of the circuit, the potentiometer 33 adjusting the balance of the bridge or resistance network and the potentiometer 21 adjusting the voltage to the bridge or resistance network.

It should be noted that the movable switch contacts 22 and 36 are interconnected as shown, being elements of a manual double pole switch 35, shown in FIGS. 2 and 5. Also, the switches having the movable contacts 20 and 38 operate in response to the removal of the device 11 from its receptacle. This operation will be discussed more fully hereinafter.

The present apparatus automatically registers or records the temperature on suitable record material. As shown in FIG. 1, the meter 24 is a conventional form of meter having a shaft 41. The shaft 41 rotates in a counterclockwise direction, as seen in FIG. 2, as current through the meter increases. Mounted on the shaft 41 for rotation therewith is an elongated hand 42 having, at its outer end, a point 43 formed as shown in FIG. 1. The point or end 43, of course, travels through an arc from right to left as seen in FIG. 2 as current through the meter increases. Thus, the position of the end or point 43 relative to the right end of its arc of movement is indicative of the temperature measured by the apparatus. The temperature is recorded by deflecting the hand 42 in the direction of the point 43 thereby pressing the point 43 against the record material which is, in this instance, an elongated strip of record paper 45, thereby perforating the paper 45.

The meter 24 is mounted inside a housing 46 for the apparatus and is secured to the inside surface of a rear wall 44 near the wall's bottom edge by a bolted bracket 49 (see FIG. 2). The meter hand 42 extends generally upwardly and the wall 44 is provided with an arcuate slot 51, best seen in FIGS. 2 and 4, into which the point 43 of the hand 42 projects. The slot 51, of course, is sufficiently long to permit the hand 42 to move through its full range of movement for the range of temperatures intended to be measured.

Secured to the outside of the wall 44 are a pair of upright members 52 and 53 that are spaced apart and respectively located at the opposite ends of the slot 51. A flat shield member 54 is connected between the upright members 52 and 53 and is held by the members 52 and 53 in spaced relation outwardly from the outer surface of the wall 44 approximately the thickness of the paper 45, as shown in FIG. 4. The shield member 54 extends above and below the slot 51 and is provided with a corresponding arcuate slot 56. Thus, the shield 54 is adapted to guide the record paper 45 as it moves upwardly across the slot 51 and to hold the paper tightly against the back surface of the wall 44 in position to be punctured by the point 43 of the meter hand 42.

A roller 47 supports a roll of the record paper 45 and is located outside the housing 46 near the bottom of the wall 44. The opposite ends of the roller 47 are respectively rotatably mounted in the members 52 and 53 as shown in FIG. 5. From the roller 47, the paper 45 extends upwardly through the space between the wall 44 and the shield member 54.

Successive temperature measurements made by the present apparatus are recorded on the record by the apparatus at spaced intervals longitudinally of the record. To this end, the tubular member 17 of the temperature sensing device 11 is made to mechanically cooperate with a record shifting mechanism, after a temperature has been measured and recorded, to shift the paper 45 upwardly a predetermined amount. The shifting mechanism comprises a pair of drive rolls 57 mounted on opposite ends of a shaft 58. The shaft 58 is journaled in a set of brackets 59 which are spaced apart and secured to the inside of the wall 44. The drive rolls 57 are located below the slot 51 and above the roller 47 and project through slots 61 formed in the wall 44 to contact a surface of the record paper 45. On the opposite side of the wall 44 is a set of idler rolls 62 mounted on a shaft 63 which is journaled at its opposite ends in the upright members 52 and 53. The idler rolls 62 engage the opposite surface of the record material, paper 45, and force it into frictional engagement with the drive rolls 57. Thus, when the drive rolls 57 are rotated in the clockwise direction as seen in FIG. 3, the record material, paper 45, will be pulled lengthwise between the rolls 57 and 62 and forced upwardly.

The temperature sensing device 11, when not in use, is kept in a receptacle 64 and returning the device 11 to its receptacle 64 at the conclusion of a temperature measuring and recording sequence rotates the drive rolls 57 a predetermined amount. To this end, the member 53 is provided with an enlarged base portion having a slanting bore 66 (see FIG. 4) forming the receptacle 64. As indicated in FIGS. 1, 3 and 4, the wall 44 and the member 53 are slotted as shown to permit one end of a blade 67 to project into the receptacle 64 when the device 11 is removed therefrom. The opposite end of the blade 67 is mounted on a pivot 68 that is journaled in two of the brackets 59. A tension spring 69, having one end secured to a lug on the wall 44 and having its opposite end secured to the blade 67, urges the blade through the slot and into the bore 66. When the device 11 is inserted into the bore 66, the blade 67 is forced to pivot out of the bore 66 to the position shown in FIG. 4.

The blade 67 and the drive rolls 57 are interconnected so that the rolls 57 will shift the record material 45 upwardly a predetermined amount each time the device 11 is inserted in the receptacle 64. Thus, a small gear 71 is secured to the end of the shaft 58. The small gear 71 meshes with a large gear 72 that is rotatably mounted on the pivot or shaft 68. A ratchet device, comprising a pair of spring elements 73 and 74, cooperate to rotate the large gear 72 in a counter-clockwise direction, as seen in FIGS. 3 and 4, when the sensing device 11 is inserted in its receptacle, and prevent the gear 72 from reversely rotating when the device 11 is removed from the receptacle. The spring element 73 is curved as shown in FIGS. 3 and 4 and has a straight end portion that is rigidly secured to the blade 67, as by welding. The opposite end of the spring 73 engages the teeth of the gear 72 as shown. The spring 74 has a straight end that is rigidly secured to the wall 44 and a free curved end that engages with the teeth of the gear 72 as shown in FIGS. 3 and 4. Hence, it can be seen that the spring 73 effects rotation of the gear 72 as the blade 67 is pushed out of the bore 66. The spring 74 holds the gear 72 against reverse rotation as the blade 67 is pulled by the spring 69 into the bore 66. This action causes the record material 45 to advance a predetermined amount upwardly each time the device 11 is inserted in the receptacle 64.

In the present apparatus the hand 42 is automatically deflected at the proper time to record the measured temperature on the record paper 45. The hand 42 is deflected by an elongated movable plate 76 (see FIGS. 1 and 4) that is supported at its opposite ends by bolts 77 projecting inwardly from the wall 44. The plate 76 slides toward the hand 42 on the bolts 77, the plate 76 being located adjacent the upper end of the hand 42 and being sufficiently long to engage the hand 42 at every operative position of the hand. A solenoid 78 forces the plate 76 against the hand 42. The solenoid 78 has its plunger 79 connected to one arm of a bell crank device 81, as shown in FIG. 1. The other arm of the bell crank 81 slides on forwardly projecting ends of a rod 82 secured to the plate 76, the rod 82 being generally U-shaped and secured to the plate 76 as shown in FIGS. 1 and 4. A pair of compression springs 83, mounted on the ends of the rod 82 between pairs of washers 84, transmits the force from the bell crank 81 to the plate 76. From FIG. 1 it can be seen that, when the solenoid 78 is energized and the plunger 79 pulled to the left, the bell crank 81 will rotate in the clockwise direction, tending to compress the springs 83. This forces the plate 76 against the hand 42, thus forcing the point 43 through the slot 51 and into the record paper 45. The springs 83 absorb some of the impact involved in the recording or perforating operation. To further prevent damage to the hand 42, an arcuate sponge rubber cushion 86 is mounted on the wall 44 along the bottom edge of the slot 51 facing the hand 42 (see FIGS. 2 and 4). The operation of the solenoid 78 occurs automatically after the device 11 has had time to assume the temperature of the subject. How this is accomplished will be discussed hereinafter.

The present apparatus is adapted to notify a user when the next temperature is to be taken. To this end a clock, indicated generally at 87 in FIGS. 1, 6 and 7, is provided. In this instance, the clock is an electric clock of a conventional twenty-four hour type. The clock is connected across a pair of power leads 88 and 89 as shown in FIG. 7, the leads 88 and 89 being conductors in a power cable 91 shown in FIG. 5. The clock 87 has a clock actuated switch 92 that is connected in circuit with other parts of the apparatus so that, when a preselected time has been reached, the clock will close switch 92 and activate an alarm or signal system (to be described later) and at the same time make connections preparatory to a temperature measurement. The clock 87 has a dial 93 that rotates as the clock operates and a lever 94 is connected to the dial 93 for rotation with the dial. The lever 94 is provided with a lug or pin, not shown, for actuating a mechanism 96 that causes the switch 92 to close when the selected time has been reached. The lever 94 can be manually rotated relative to the dial 93 and by such rotation the time for operation of the alarm or signal system is selected.

For birth control purposes it is important that basal temperatures be taken daily. Therefore, in the present apparatus, it is preferable that the clock be a 24-hour clock and that the switch 92 be automatically reset to actuate the alarm system twenty-four hours later. Thus, the mechanism 96 is provided with a lever 97 that projects upwardly from the clock 87 adjacent the solenoid plunger 79 and in the path of an end portion 98 of the bell crank 81. When the plunger 79 is pulled into the solenoid, the end portion 98 of bell crank 81 shifts the lever 97 to the position shown in FIG. 6 and this movement of the lever 97 opens the switch 92. This resets the alarm. Twenty-four hours later the lug on the arm 94 shifts the mechanism 96 to again close the switch 92 and at the same time shifts the lever 97 to the right of the position shown in FIG. 6.

The previously mentioned alarm or signal is preferably in the form of a flashing light rather than an audible type of alarm. (An audible type of alarm might fully arouse a sleeping individual and preclude the possibility of taking a basal temperature.) Thus, in the present system, the alarm or signal comprises an electric light 99 that is connected across the two leads 88 and 89, in series with a flasher unit 101, a normally closed switch, having a movable contact 102 that normally engages a fixed contact 102a, and the clock switch 92, as shown in FIG. 7. Thus, upon closing of the clock switch 92, the light 99 will begin flashing on and off and will continue to flash until the device 11 is removed from its receptacle.

The light 99 also serves as a source of night illumination and is arranged to burn steadily while the temperature is being measured and recorded. To this end a shunt connection 103 (see FIG. 7) is provided around the flasher unit 101 and the switch 92 through a pair of normally open switches, one switch having a movable contact 104 that cooperates with the fixed contact 102a and the other switch having a movable contact 106 that cooperates with a fixed contact 106a. In the present apparatus the movable contacts 104 and 106 engage the contacts 102a and 106 respectively and the movable contact 102 disengages the fixed contact 102a, in response to the removal of the device 11 from its receptacle, thus closing the shunt around the flasher 101. Thereafter, the light 99 will burn steadily until the device 11 is returned to its receptacle. The light 99 is located in the housing 46 at the front left hand corner of the apparatus, as shown in FIG. 1, the flasher unit 101 being located in the base for the light. The housing 46 has translucent wall portions 107 and 108, located respectively at the end and front of the housing adjacent the lamp 99.

As was mentioned before, the solenoid 78 is energized (to record the temperature measured) a predetermined period (about ten seconds) after the device 11 has been removed from its receptacle. This delayed operation is provided by connecting the solenoid 78 across the leads 88 and 89 in series with the clock switch 92 and also in series with a time delay device 109, comprising a normally open heat responsive switch 111 and a resistance heating element 112 located to heat the switch 111. The heat responsive switch 111 is connected directly in series with the solenoid 78 across the leads 88 and 89. The heating element 112 is connected across the leads 88 and 89 in series with a normally open switch having a movable contact 113 that cooperates with a fixed contact 113a. The contact 113 is arranged to engage the fixed contact 113a upon removal of the device 11 from its receptacle. Thus, when the device 11 is removed from its receptacle, the heater element 112 is connected to be energized. A predetermined time thereafter, in the present instance approximately ten seconds, the heater 112 heats and closes the heat responsive switch 111. Closure of the switch 111 operates the solenoid 78 to register the temperature on the record paper 45. At the same time, the solenoid 78 shifts the lever 97 to the position shown in FIG. 6, thus resetting the alarm for operation twenty-four hours later, and also disconnecting the solenoid 78 and the heater element 112.

As has been noted heretofore, there are several switches shown in the circuits in FIG. 7 that are operated by the removal of the device 11 from its receptacle, namely, switches 20, 38, 102, 104, 106 and 113. (Note that the switches are identified by the reference numerals of their movable contacts.) These switches are, in the present apparatus, arranged in a gang as shown in FIGS. 1, 2, 3 and 4 and located adjacent the receptacle 64 for the device 11 and the blade 67 that was previously described. The movable contacts of the ganged switches are interconnected by a member 114 of insulating material arranged as shown in FIGS. 2, 3 and 4. Note, also, that some insulation 115 is inserted between contacts 20 and 38a to keep them separated (see FIGS. 3 and 4).

To operate the movable contacts of the various ganged switches, the blade 67 is provided with an operating member 116 that is secured, as by welding, to the blade 67, the member 116 being located on the end of the blade 67 opposite the end which enters the bore 66. The operating member 116 is, in the present instance, a rod formed, as shown in FIGS. 3 and 4, to press against the edge of the member 114 when the device 11 is in its receptacle and to release the member 114 when the blade 67 is not in the receptacle. Thus, the blade 67 not only operates the mechanism for advancing the record material but also operates, in unison, the ganged switches.

The present apparatus operates in the following manner to measure and record a typical sequence of temperatures. A selected time will have been set on the clock 87 by shifting the lever 94. As the clock operates, the dial 93 rotates until the lever 94 reaches the position indicated by the arrow marked "time" in FIG. 6. When this happens the lug (not shown) on the lever 94 shifts the mechanism 96 and causes the switch 92 to close. Closure of the switch 92 connects the light 99 across the leads 88 and 89 through the normally closed switch 102 and the flasher unit 101. Thus, the light 99 will begin to flash on and off. The light 99 will continue to flash until the temperature sensing device 11 is removed from its receptacle at the back of the apparatus.

The flashing of light 99 may not awaken a sleeping person immediately but it will continue flashing and will act as a reminder to take the temperature when the person begins to awaken. When it is noted that the light 99 is flashing, the device 11 is removed from its receptacle 64 and is placed in the mouth of the person whose temperature is to be taken. Removal of the device 11 from its receptacle 64 permits the spring 69 to pull the blade 67 to the position shown in FIG. 4. This causes the member 116 to disengage the member 114, thus closing switches 20, 38, 104, 106 and 113 and opening switch 102. The closing of switches 104 and 106 and the opening of switch 102 connects the light 99 in shunt relation around the flasher unit 101 so that the light will burn continuously until the device 11 is returned to the receptacle. The closing of the switch 113 connects the heater element 112 in the circuit to begin heating the heat responsive switch 111. At the same time, the closing of switches 20 and 36 connects the batteries 18 and 37 to energize the bridge and the amplifier transistor 23. Since transistors do not require an appreciable warm-up time, the meter 24 will immediately begin to reflect the temperature of the thermistor 16 by shifting the hand 42 across the paper to the proper position. Within a very few seconds the thermistor 16 will have assumed the temperature of the person's mouth and the heater element 112 of the time delay device 109 will have heated and closed the switch 111, thus energizing the solenoid 78. Energization of the solenoid 78 pulls the solenoid plunger 79 to the left as seen in FIG. 6. This action, in turn, pushes the plate 76 against the hand 42 of the meter 24, thus causing the point 43 to perforate the second material 45. The same action forces the end portion 98 of the bell crank 81 to shift the lever 97 of the clock mechanism 96 to the position shown in FIG. 6, thus opening the switch 92. This deenergizes the heater 112 and the solenoid 78. The meter 24 will continue to operate and its hand 42 will continue to indicate the temperature of the thermistor 16. However, registering of a temperature on the paper 45 cannot again take place until the device 11 has been returned to its receptacle. When the device 11 is returned to its receptacle, the blade 67 is forced to the position shown in FIG. 3, thus shifting the record material 45 upwardly by means of the drive rolls 57 coupled to the blade 67. The same movement of the blade 67 brings the operating member 116 into engagement with the member 114, simultaneously opening the switches 20, 38, 104, 106 and 113 and closing the switch 102. This deenergizes the entire circuit including the light 99 but not including the clock 87. Approximately twenty-four hours later, when the arm 94 again reaches the "time" position, the light 99 will begin to flash starting a new temperature measuring sequence.

It should be recognized that the present apparatus is adapted to measure a temperature at any time, whether or not the clock switch 92 is closed. However, under these circumstances, the apparatus will not automatically record the temperature measured. To merely measure a temperature it is only necessary to remove the device 11 from its receptacle and place it in the subject's mouth. The removal of the device 11 from its receptacle will energize the bridge and amplifier circuit by closing switches 20 and 38. The light 99 will operate, because of the closing of switches 104 and 106. The temperature is determined by noting the position of the hand 42 relative to the record material. The light 99 will cause the hand 42 to be silhouetted through the paper 45.

From the foregoing it can be seen that the present invention provides temperature measuring apparatus adapted to quickly measure and automatically record human temperatures. The apparatus is sufficiently simple to be used by untrained persons and can be conveniently used at home. The apparatus includes a silent alarm or signal system that will permit the measurement of basal temperatures, and automatically rests its alarm system after recording a temperature. Moreover, the record is automatically moved longitudinally a predetermined amount after each temperature measurement is concluded, and temperature is indicated by the transverse position of the perforation. Thus, the apparatus will automatically prepare a chart of basal temperatures which can be used for birth control purposes.

Although the invention has been described in connection with a specific structural embodiment thereof, it is to be understood that various modifications and alternative structure may be resorted to without departing from the scope of the invention as defined in the appended claims.

I claim:

1. Apparatus for measuring and recording human temperatures, said apparatus comprising a temperature sensing device, means connected to said device for measuring the temperature sensed by said device, structure for supporting record material, and means cooperating with said measuring means and said structure for recording on the record material the temperature measured, the connection between said sensing device and said measuring means being by elongated flexible means whereby the position of said sensing device can be manually changed with respect to said measuring means, said structure holding the record material stationary during the measuring and recording of such temperature, said device and said structure cooperating to shift said record a predetermined amount relative to said structure after such temperature is recorded on the material.

2. Apparatus according to claim 1, in which said structure includes a receptacle for holding said device when not in use, said structure including means for shifting the record material in one direction a predetermined amount each time said device is placed in said receptacle.

3. Temperature taking and recording apparatus, comprising a supporting structure having a receptacle, a temperature sensing device removably mounted in said receptacle, means on said structure for holding record material stationary relative to said structure when said device is removed from said receptacle, means on said structure and connected to said device for measuring the temperature sensed by said device and for registering on the material the temperature measured, and means for actuating said device and said measuring and registering means in response to removal of said device from said receptacle.

4. Temperature taking and recording apparatus, comprising a supporting structure having a receptacle, a temperature sensing device removably mounted in said receptacle, means on said structure for holding record material stationary relative to said structure when said device is removed from said receptacle, means on said structure and connected to said device for measuring the temperature sensed by said device and for registering on the material the temperature measured, and means coacting with said holding means for shifting said material relative to said structure in response to insertion of said device into said receptacle, whereby sequential temperatures will be recorded at spaced intervals on the material.

5. Temperature taking and recording apparatus, comprising a supporting structure having a receptacle, a temperature sensing device removably mounted in said receptacle, means on said structure for holding record material stationary relative to said structure when said device is removed from said receptacle, means on said structure and connected to said device for measuring the temperature sensed by said device and for registering on the material the temperature measured, switch means for effecting energization of said device and said measuring and registering means, and operating means having a portion engaged by said device when the device occupies said receptacle, said operating means coacting with said switch means to effect energization of said device and said measuring and registering means in response to removal of said device from said receptacle and deenergization of said device and said measuring and registering means in response to said device being inserted into said receptacle, said operating means also coacting with holding means to shift said material relative to said structure in response to said device being inserted into said receptacle.

6. Apparatus according to claim 5, in which said operating means includes a member located to enter a space in said receptacle normally occupied by said device upon removal of said device from said receptacle, and means for urging said member into said space, said device holding said member out of said space when said device is mounted in said receptacle.

7. Temperature taking and recording apparatus, comprising a supporting structure having a receptacle, a temperature sensing device removably mounted in said receptacle, means on said structure for holding record material, means on said structure and connected to said device for measuring the temperature sensed by said device and for registering on the record material the temperature measured, a manually set clock mechanism, signaling means for giving a perceptible signal, and actuating means responsive to the operation of said clock mechanism and to the removal of said device from said receptacle for actuating said signalling means from the time set on said mechanism until said device is removed from said receptacle and for actuating said device and said measuring and registering means upon removal of said device from said receptacle.

8. Apparatus according to claim 7, in which said signaling means comprises a light and a flasher element connected to said light in a manner to cause said light to flash on and off when energized, said flasher element and said light being energized upon operation of said actuating means when said device occupies said receptacle.

9. Apparatus according to claim 7, in which said actuating means comprises a plurality of switches, one of said switches being operated by said clock mechanism and the remaining switches being operated by said device when said device is removed from and inserted into said receptacle.

10. Apparatus according to claim 9, in which said signaling means comprises a light and a flasher element connected thereto, a first of said remaining switches being connected to said flasher element and a second of said remaining switches being connected to said light in shunt relation to said flasher, said first and second switches being arranged so said light will continuously flash on and off from the time set on the clock mechanism until said device is removed from said receptacle and so said light will glow continuously thereafter until said device is reinserted into said receptacle, whereby said light acts first as a signaling device and thereafter as a source of illumination.

References Cited by the Examiner

UNITED STATES PATENTS

| | | | |
|---|---|---|---|
| 1,300,525 | 4/19 | Warren | 346—93 X |
| 1,901,209 | 3/33 | Vayda | 73—343.5 |
| 2,598,520 | 5/52 | Eastman | 73—343.5 |
| 2,684,473 | 7/54 | Shannon | 73—343.5 X |
| 2,776,569 | 1/57 | Biro | 73—343.5 |
| 2,818,482 | 12/57 | Bennett | 73—362 X |
| 2,981,587 | 4/61 | Kennedy | 346—93 |
| 3,082,625 | 3/63 | Zimmerman | 73—362 |

ISAAC LISANN, *Primary Examiner.*